Oct. 2, 1962 R. W. TRIPP 3,056,909
ANALOG CONTROL SYSTEMS
Filed Dec. 7, 1959 6 Sheets-Sheet 1
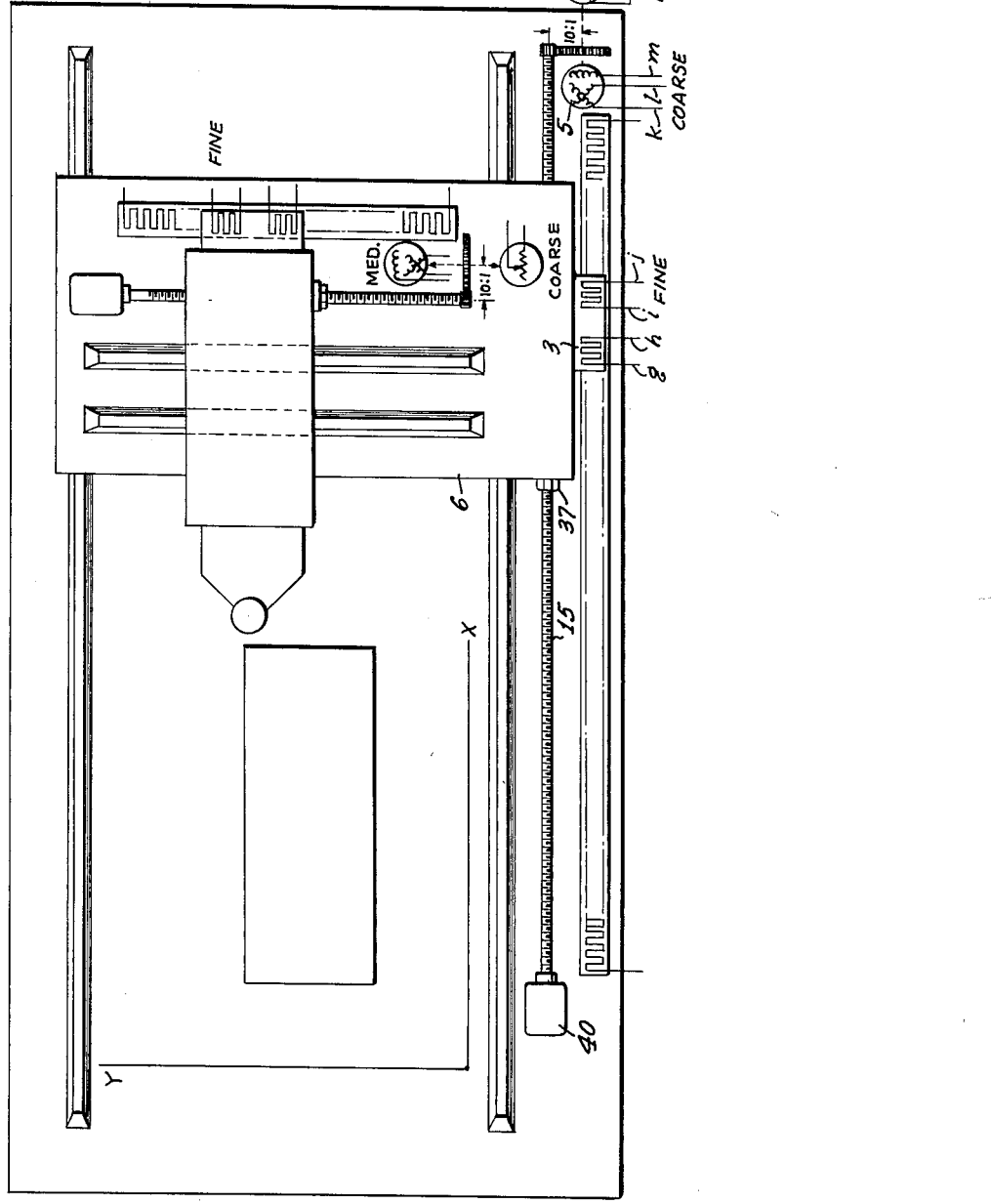
ROBERT W. TRIPP
INVENTOR
BY *W. E. Beatty*
ATTORNEY

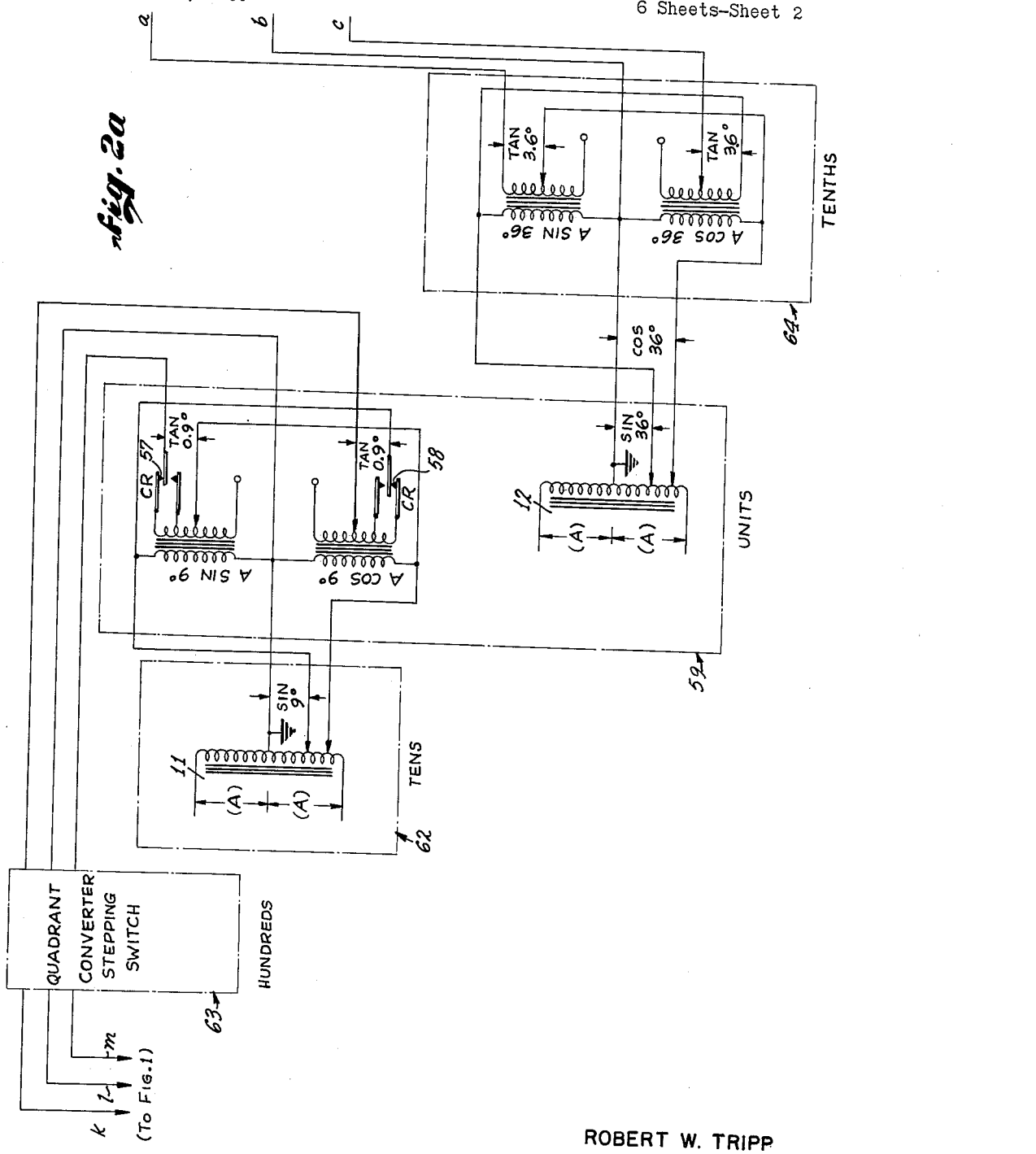

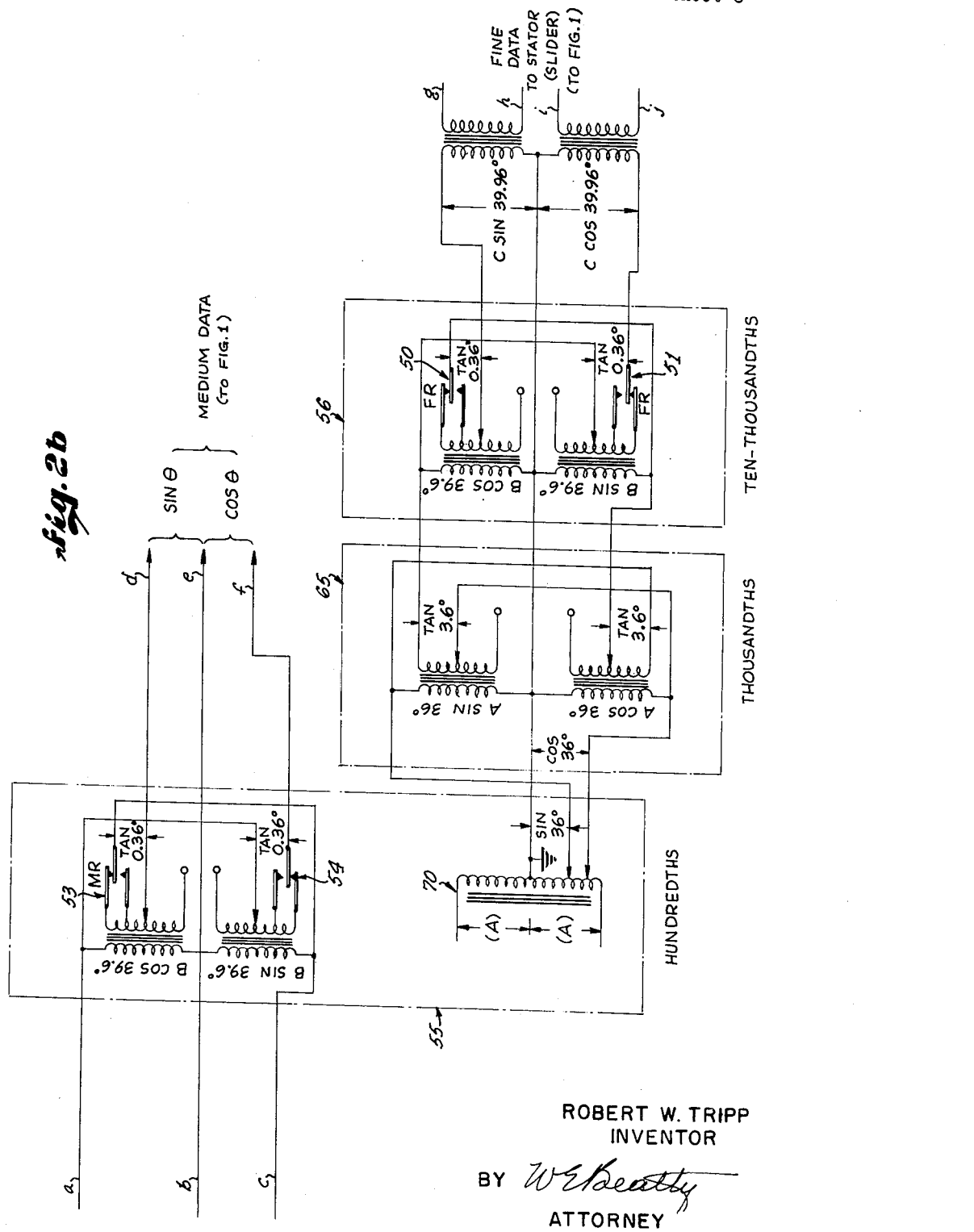

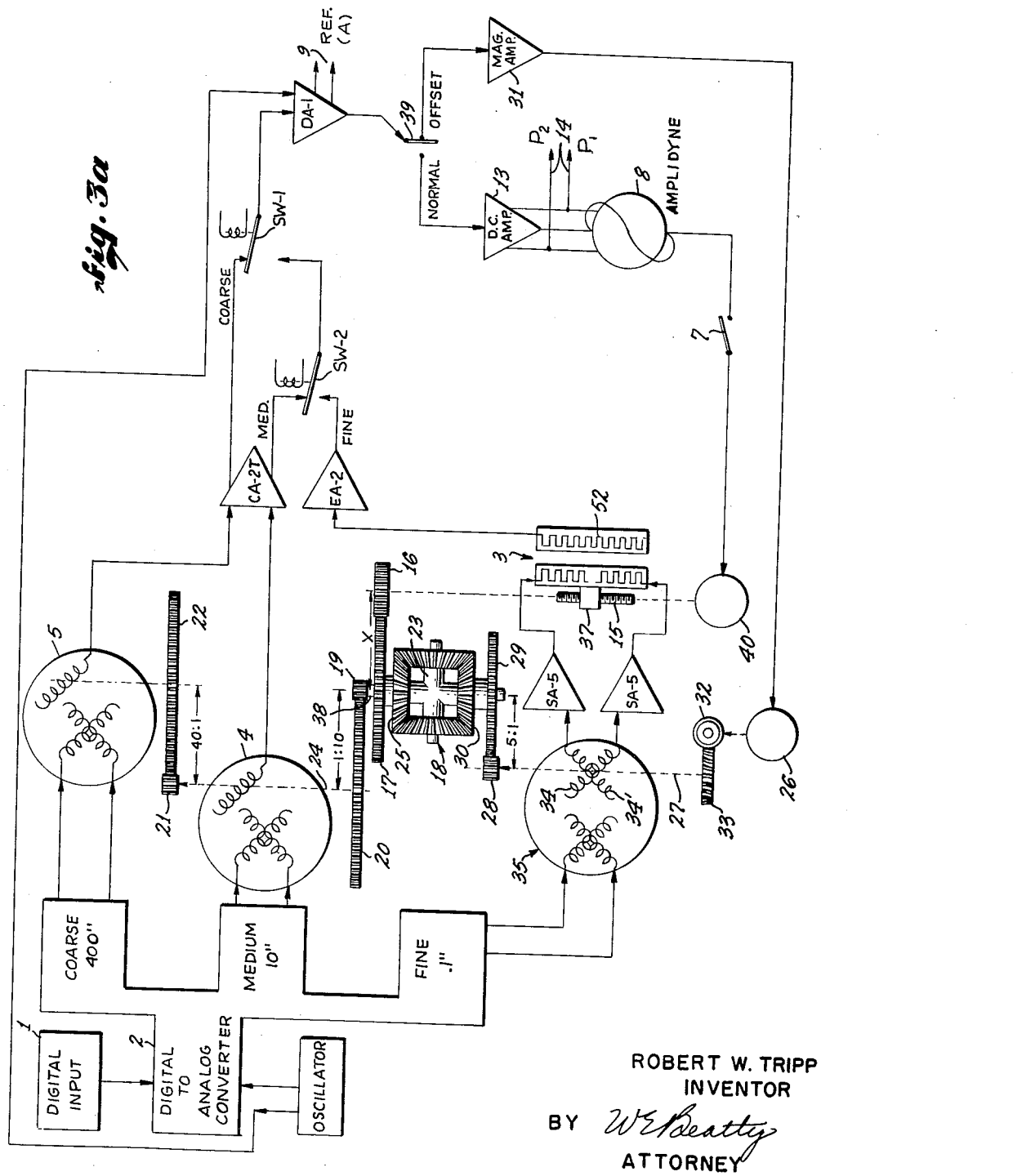

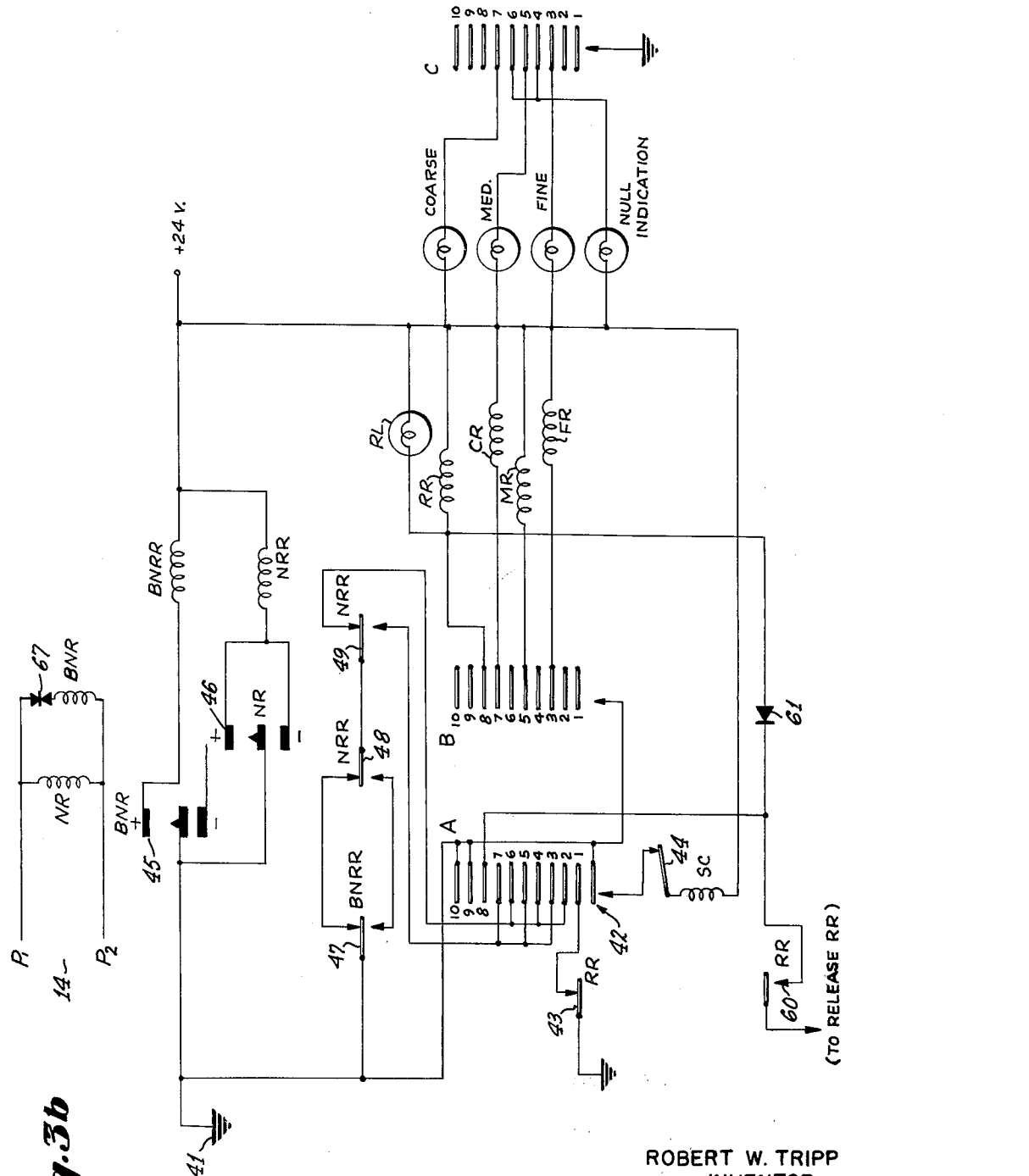

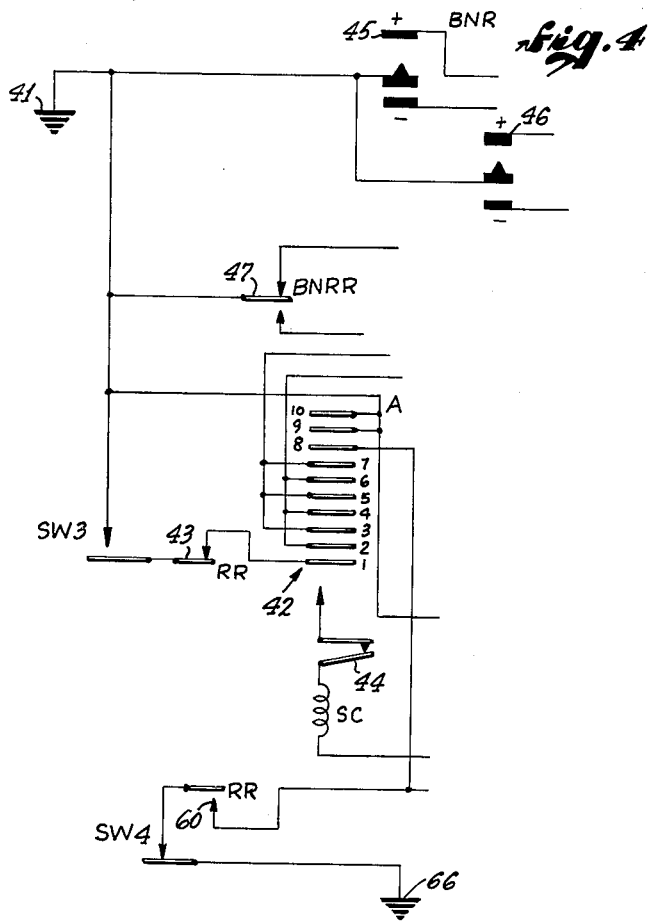

United States Patent Office 3,056,909
Patented Oct. 2, 1962

3,056,909
ANALOG CONTROL SYSTEMS
Robert W. Tripp, Bronxville, N.Y., assignor to Inductosyn Corporation, Carson City, Nev., a corporation of Nevada
Filed Dec. 7, 1959, Ser. No. 857,594
12 Claims. (Cl. 318—30)

The present invention relates to a test circuit or checking circuit for checking the operating condition of an automatic positioning system wherein a servo system controlled by a plurality of grades of data transmission elements is employed for controlling a driven element such as a machine tool in accordance with a program including input data in terms of the path of the driven element or the machine tool. A control system of this type is disclosed and claimed in several patents issued in applicant's name, such as 2,843,811, patented July 15, 1958; 2,849,668, patented August 26, 1958; 2,875,390, patented February 24, 1959.

An object of the present invention is to provide a checking circuit which makes the test every time the machine stops on position, and allow, or disallow machining operations to start, depending upon whether the circuits operate correctly. The need for such a circuit becomes understandable when it is realized that even with a mal-function, the machine will stop somewhere, but not on the correct position. Without this circuit the operator would know only that the machine has stopped, and unless he actually performs the machining operation and then inspects the work with measuring instruments, he could never be absolutely sure that he was on the correct position. But, of course, by this time it is too late.

A further object is to provide a checking circuit which will inspect for a mal-function in about one second of time, before the machining operation starts.

The invention provides a checking circuit which inserts a test signal into the system to measure its effect upon the system, to compare this effect against what it should have been if the system were operating correctly, and to signal right or wrong.

The test circuit of the present invention insures that when the machine motion has stopped it has done so as a result of correct conversion of the input data and not as a result of faulty operation. For example, the checking cycle is interrupted and a warning signal produced in the event of either an open circuit or lack of excitation to the data transmission circuits.

The invention is illustrated as applied to a servo circuit employing three grades of data transmission elements, namely fine, medium and coarse.

In general, the sequence of operation in making a test is to test the data elements in the following order, namely fine, medium and coarse, a signal being provided to indicate whether the test is successful. While there is an illustration of a signal individual to each of the three grades of data elements, it has been found sufficient to employ only one signal pertaining to a complete cycle of test.

In brief, the steps provided are as follows: Disable the drive, once the machine has come to a servoed state, wherein the servo has driven the machine to the position called for by the input data and hence with a null indication. The next step is to derive from the source of excitation for the data elements a test voltage to thereby determine if the excitation source is normal and active. Specifically, this source includes a voltage divider for the sine and cosine currents supplied to the space quadrature coils of the Inductosyn or resolver. The test voltage thus picked off is supplied to the data transmission element under test, namely the fine one in the first instance and the resulting output is taken from this data element, thereby checking the normal condition of this data element and its circuit. The test output thus obtained is employed to advance the test from one data element to another, subject, however, to the supervisory control which insures that the existing condition of the data element from which the transfer is being made is in a null condition, after the test voltage is removed from it in the course of preparing to test the next data element.

For further details of the invention, reference may be made to the drawings wherein:

FIG. 1 is a plan view of a machine tool having drives for advancing a work piece and a cutter or tool relatively to each other, the coarse, medium and fine data elements for axis X having circuit connections to other figures as indicated.

FIGS. 2a and 2b fit together as indicated and schematically show the sine and cosine inputs for the data elements as well as the relay contacts for picking off the test voltages.

FIG. 3a is a schematic view of a zero offset control for a machine control system disclosed and claimed in co-pending application 638,722, filed February 7, 1957, for Zero Offset for Machine Tool Control.

The leads P1, P2 in FIG. 3a connect with the corresponding leads in FIG. 3b which is a schematic circuit showing a switch for testing the coarse, medium and fine data elements in sequence, the coils CR, MR, FR in FIG. 3b operating the corresponding relay contacts in FIGS. 2a and 2b.

FIG. 4 is a schematic view showing a modification of FIG. 3b. In FIG. 3a the test is repeated automatically, while in FIG. 4 the initiation of the test is under control of a manual switch.

Referring in detail to the drawings, the digital input 1 in FIG. 3a and the digital-to-analog converter 2 in that figure may be in accordance with the disclosure of applicant's Patent 2,849,668, dated August 26, 1958, the coarse, medium and fine input in the patent being indicated at 4 and appearing in FIGS. 4, 6, 7, 8 and 9, the associated circuits in the patents constituting a converter for the fine data element 3 of the patent in FIGS. 7 and 10 which is shown in the linear form and which corresponds to the Inductosyn indicated at 3 in FIG. 3a of the present case. The medium resolver indicated at 2 in FIGS. 5 and 10 of the patent corresponds to the medium resolver indicated at 4 in FIG. 3a of the present case. In the patent, the coarse data element indicated at 1 in FIGS. 5 and 10 of the patent is shown as a potentiometer, but this coarse data element indicated at 5 of the present case is shown as a rotary resolver.

The fine, medium and coarse data elements 3, 4 and 5 of FIG. 3a are shown in FIG. 1 of the present case in operative relation to a machine tool for controlling the position of carriage 6 with reference to one axis indicated at X, although such data elements and the checking circuit of the present invention may similarly be applied to one or more other axes, one of which is indicated at Y in FIG. 1.

As FIG. 1 herein corresponds with difference noted, to the showing in FIG. 10 of the above mentioned patent, and to the showing in FIG. 19 of Patent 2,875,390, February 24, 1959, a further description of FIG. 1 appears unnecessary.

The circuit of FIG. 3a relates to a computer for zero offset and is described and claimed in co-pending application S.N. 638,722, filed February 7, 1957, for "Zero Offset for Machine Tool Control."

FIG. 3a is a simplified showing of the gearing, further details which appear unnecessary herein are shown in FIG. 2 of S.N. 638,722.

FIGS. 1 and 3a have been included in the present disclosure in order to fully disclose a digital system to which the check circuit of the present invention may be applied, FIG. 1 having been modified as above noted to show a coarse resolver 5 instead of a coarse potentiometer, and FIG. 3a having been modified to show a switch 7 for disabling the output of amplidyne 8, to show leads indicated at 9 for a reference source of voltage for the phase detector DA–1, this source also being connected between ground and one end or the other of the hundredths, tens and units input transformers 70 in FIG. 2b, 11 and 12 of FIG. 2a. FIG. 3a was also modified to show the terminals P1–P2, being the plate leads from the D.C. amplifier 13, these leads being an input indicated at 14 in FIG. 3b for the coils of the relays BNR and NR, these relay coils having contacts similarly marked in FIG. 3b, as later described.

Before proceeding with a description in detail of the checking circuit, a brief description will now be given of the zero offset computer of FIG. 3a.

In FIG. 3a, the position of lead screw 15 is transmitted to the medium resolver 4 through gears 16, 17, differential 18 and gears 19, 20. The position of lead screw 15 is transmitted to the coarse resolver 5 from gear 20 through gears 21, 22.

The cage 23 of differential 18 is connected directly to gear 19, which in turn meshes with the medium resolver shaft 24 at a 10:1 ratio. Gear 19, on the spider 23, is the output gear of the differential 18, and this output is proportional to the sum, or difference of two inputs, one of which is from the machine via gear 17 which is fixed to bevel gear 25, the other input being via the zero offset motor 26, shaft 27 and gear 28 meshing with gear 29 fixed to bevel gear 30. Gear 19 thus has an output proportional to the sum or difference of its two inputs, the spider 23 having a scale value per revolution twice that of either end gear.

Suitable rotation of gear 29, acting through differential 18, will position or offset the shaft 24 of resolver 4 as desired with respect to the lead screw 15. Since the coarse resolver 5 is permanently geared to the medium resolver 4 through gears 21, 22, the correct relative positions will be maintained of resolvers 4 and 5 in accordance with their 40 to 1 scale factors as shown.

The magnetic amplifier 31 is in circuit with the A.C. zero offset motor 26.

Gear 29 is driven by offset motor 26 through a non-reversible pair of gears 32 and 33, shaft 27 (for the rotary windings 34 and 34') and gear 28. Resolver 35 is an electrical differential in series with the fine data element 3 and is arranged to rotate once for each 0.1 in. advance of the machine, i.e., nut 37.

The rotation of gear 29 does not work back through the differential 18 to operate the lead screw 15, since the frictional load on the lead screw 15 is large compared to the load imposed by the coarse and medium resolvers 5 and 4 and the gear train which drives them.

In FIG. 3a, the gear ratio between the lead screw 15 and the shaft 38 of cage 23 is indicated as "x," as various leads may be obtained by selecting any desired ratio for "x," the relation with the gear ratio shown, being as follows.

| Ratio "x": | Lead |
| --- | --- |
| 1:5 | .1" |
| 2:5 | .2" |
| 1:2 | .25" |
| 1:1 | .5" |

For normal operation, the switch 39 is moved to its alternate position, the error currents from the coarse, medium and fine data elements 5, 4 and 3 acting through the D.C. amplifier 13 and amplidyne 8 to operate the D.C. servomotor 40 which drives these data elements to a null position corresponding to the positional command of the input 1. The error current from resolvers 5 and 4 is supplied to amplifiers CA–2T, the error current from the fine data element 3 being supplied to amplifier EA–2. When the coarse error current is reduced to a value which can be handled by the medium and or fine data elements, the switch SW–1 connects in the switch SW–2 which likewise switches off the medium error current when the error current is reduced to a value which can be handled by the fine data element. These error currents as shown are supplied to the phase sensitive amplifier DA–1.

When it is desired to offset the machine coordinates with respect to the program zero of the input 1, the switch 39 is moved to the position shown. Having initially zeroed the resolvers 5, 4 and 35 for any position, the zero offset is set in as follows:

(1) Position the workpiece on the machine at the desired location with respect to the spindle or tool.
(2) With main drive off, insert the command in the input 1 corresponding to this position of the work.
(3) Move switch 39 to position shown to connect motor 26 into the servo system in place of the servo drive motor 40.
(4) Allow motor 26 to drive to a position of zero error.

The zero offset is now set.

All three error signals operate at so-called different "speeds" or under control of switches SW–1 and SW–2, which are similar to switch 125 in FIG. 16, of Patent 2,875,390, dated February 24, 1959.

Patent 2,839,711, dated June 17, 1958, discloses and claims a computer for computing the sine and cosine values of an angle equal to the sum of the angles represented by the digits in decimally related digital groups which may be used in input 1.

Referring to FIG. 4, switch SW–3 may be operated manually, in order to start the test, or this switch may be operated by relay 7 of the positional and velocity null indicator of S.N. 827,518, filed July 16, 1959, wherein the relay 7 closes contacts indicated therein at 8, to complete a circuit and thereby give a null indication when both the position and velocity of the machine are zero.

Prior to making the test, the machine is disabled, for example by opening switch 7 in the output of amplidyne 8.

A ground 41, as shown in FIGS. 3b and 4, from the machine or manual pushbutton switch SW–3 grounds the stepper coil SC, of a stepping switch 42 having banks A, B and C, through the manually closed ready relay contacts 43 and position 1 of the stepper bank A. The stepper interrupter 44 advances the stepper 42 to position 2.

If servo motor 40, FIG. 3a, has driven the positioning system to a null, both polar relays NR and BNR, FIG. 3b will be opened at contacts 45 and 46. These polar relays will be actuated by a signal at least as great as .0001". This signal is derived from the coarse, medium and fine data elements 5, 4 and 3, FIGS. 1 and 3a, which control the machine motions. The repeater relays NRR and BNRR will not be operated when a null signal exists at terminals P1–P2 and ground 41 will be connected to position 2—bank A on the stepper 42 through contacts 47, 48 and 49. This will advance the stepper 42 to position 3. Through bank B of this stepper, relay FR will be operated and introduce a predetermined test signal into the fine channel, the contacts of this relay being shown at 50 and 51 in FIG. 2b and controlling the output from the ten-thousandths stepper 56. This test signal corresponds to a linear motion of one or more 0.0001" of the fine data element 3. If the resultant error signal from the fine scales 52 is correct, with proper gain and phase the two polar relays, NR and BNR, will be actuated, closing contacts 45 and 46. The two repeater relays BNRR and NRR will actuate, closing contacts 47, 48 and 49 and advance the stepper 42 to position 4. This position will recheck the original null, as the stepper 42 will not advance unless the signal at terminals P1–P2 is zero. If this is satisfied, the stepper 42 will advance to position 5. Through position 5 of bank B, the medium relay MR will be operated. The contacts 53, 54 (FIG. 2b) of this relay picks off a test signal from the medium command at the hundredths stepper 55. The test signal will cause the medium-fine switch, SW–2, in the control equipment to switch to medium, FIG. 1. If the condition of the medium channel is normal, this will produce an error signal at terminals P1–P2 and operate the polar relays NR and BNR and repeater relays BNRR and NRR through contacts 45 and 46. This advances the stepper 42 to position 6 through contacts 47, 48 and 49. The original null is again checked at this position as explained in connection with steps 4 and 5, as the stepper will not advance unless the signal at terminals P1–P2 returns to zero. This condition having been satisfied, the stepper 42 will advance to position 7. The coarse relay, CR, is operated through position 7 of bank B. This relay has contacts 57 and 58, see FIG. 2a, controlling the output from the units stepper 59 to introduce a coarse test signal, allowing the electronics to switch and produce a signal at terminals P1–P2, FIG. 3b. This test signal will operate both polar relays and repeater relays as explained above and advance the stepper 42 to position 8. Position 8 of bank B will actuate the ready relay RR and the ready light RL. The ready relay RR will be held in through its own contacts 60 and diode 61. When the ready relay contacts 60 have closed, a ground 66, see FIG. 4, will be placed on position 8—bank A of the stepper. This will cause the stepper to self-interrupt back to position 1.

The check cycle cannot be repeated until the ready relay RR is de-energized, since its contacts 43 are in an open state. The ready relay RR is de-energized by operating the read switch SW–4, see FIG. 4.

The stepping switch assemblies, 59 (units), 62 (tens), 63 (hundreds), 64 (tenths), 55 (hundredths), 65 (thousandths) and 56 (ten-thousandths) are used to convert the digital information of the command input into the correct analog voltages and contain computer transformers arranged so that proper sine-cosine voltages representative of this digital information is obtained, as described and claimed in applicant's patents above noted.

The stepper 63 is used in the hundreds digit. It does not contain any computer transformers but relies on phase reversal of the sine-cosine data as described in connection with the quadrant converter stepper No. 3, FIG. 6, of Patent 2,839,711. The basic assembly contains a stepping switch, whose contacts are wired to perform the above mentioned phase reversal. The position of this stepper is dependent upon the decimal information as derived from the decoder assembly and reflects the digital input either from tape or dial input.

The 10 kc. reference voltage is supplied to points AA at steppers 55, 62 and 59. According to the desired direction of machine motion, the excitation can be inserted by wiring the referenced voltage between ground and the desired one of the terminals AA, with respect to the phase detector DA–1, Fig. 3a.

The signal lamps indicated in FIG. 3b are shown connected to steps of the bank C, and this bank may be omitted.

Referring to FIG. 2a, the coarse data of sin θ and cos θ on lines k, l, m, is supplied to the coarse resolver 5 in FIG. 1, by way of lines thus marked.

The medium data of sin θ and cos θ from lines d, e, f, FIG. 2b, is supplied to the medium resolver 4 in FIG. 1 on corresponding lines.

The fine data of sin θ and cos θ from the two transformers having lines g, h, i, and j in FIG. 2b is supplied to the quadrature windings of the stator slider of the fine data element 3 in FIG. 1 on corresponding lines.

Referring to FIG. 3b, terminals P1–P2 indicated at 14 are in the output of D.C. Amp. 13, FIG. 3a which has a D.C. error input from the circuit shown. In FIG. 3b the Zener diode 67 serves as a biasing device preventing the relay BNR from energizing until a specific D.C. voltage level, higher than that required to operate relay NR, is obtained from the output of the D.C. Amp. 13 in FIG. 3a. In other words, this diode 67 serves as a blocking device which allows conduction through relay BNR only above a certain level as determined by its characteristics. As a result, relay NR will always energize sooner than relay BNR. This biasing arrangement establishes that the test signal is of the proper magnitude necessary to conclude that the channel under test is operating correctly as to magnitude, proper phase of the test signal being established by the fact that the stepping switch 42 is under control of polarized relays NR and BNR which are operated by D.C. error current of proper polarity derived from the phase chosen between one of the points A, A and ground at the A.C. reference voltage input to the input transformers indicated at 11, 12 in FIG. 2a and 70 in FIG. 2b.

The effect of the check circuit is to provide small changes in the values of the sine and cosine voltages rather than to provide small voltages.

I claim:

1. A test circuit for testing a plurality of grades of data elements controlling a servo motor, each of said data elements having means providing a source of excitation, means for deriving from said providing means a test signal for each grade of data elements, switching means for applying one of said test signals to the input of the corresponding one grade of data elements, sequence switching means operated by the output signal resulting from such applying, said sequence switching means having contacts for removing the test input from said one grade of data element and having other contacts for applying another of said test signals to its corresponding other grade of data element, and means insuring that said sequence switching means will not switch from one grade to another unless the output of said one grade is null when its test signal is thus removed, one of said data elements having in space quadrature windings, said means providing a source of excitation including means supplying sine and cosine voltages for said quadrature windings, the test signal for said last mentioned data element being a small change in value of said sine and cosine voltages.

2. A test circuit according to claim 1, said grades including fine, medium and coarse grades of data elements, the contacts of said sequence switching means acting to control said data elements in sequence.

3. A test circuit according to claim 1, said sequence switching means being a stepping switch, and means providing a start command to initiate operation of said stepping switch.

4. A test circuit according to claim 3, said providing means being a manual switch.

5. A test circuit according to claim 3, said providing means being a start command signal from said data elements.

6. A test circuit according to claim 3, including circuits for resetting said stepping switch to start position on completion of a complete cycle of testing said data elements.

7. A test circuit for testing a data element controlling a servo motor, said data element having means providing a source of excitation, means for deriving from said providing means a test signal for said data element, switching means for applying a test signal to the input of said data element, sequence switching means operated by the output signal resulting from such applying, said sequence switching means having contacts in one position for supplying said test signal to, and having other contacts in another position for removing said test signal from the input of said data element, and means insuring that said switching means will not switch from one of said positions to the other unless the output of said data element is null when its test signal is thus removed, said data element having space quadrature windings, said means providing a source of excitation including means supplying sine and cosine voltages to said quadrature windings, said test signal being a small change in value of said sine and cosine voltages.

8. A test circuit for testing a plurality of grade of data elements controlling a servo motor, each of said data elements having means providing a source of excitation, means for deriving from said providing means a test signal for each grade of data elements, switching means for applying one of said test signals to the input of the corresponding one grade of data elements, sequence switching means operated by the output signal resulting from such applying, said sequence switching means having contacts for removing the test input from said one grade of data element and having other contacts for applying another of said test signals to its corresponding other grade of data element, and means insuring that said sequence switching means will not switch from one grade to another unless the output of said one grade is null when its test signal is thus removed, each of said data elements having space quadrature windings said means providing a source of excitation including means supplying sine and cosine voltages for the quadrature windings of each of said data elements, the test signal for each of said data elements being a small change in value of its respective sine and cosine voltages.

9. A test circuit for testing a plurality of grades of data elements controlling a servo motor, each of said data elements having means providing a source of excitation, means for deriving from said providing means a test signal for each grade of data elements, switching means for applying one of said test signals to the input of the corresponding one grade of data elements, sequence switching means operated by the output signal resulting from such applying, said sequence switching means having contacts for removing the test input from said one grade of data element and having other contacts for applying another of said test signals to its corresponding other grade of data element, and means insuring that said sequence switching means will not switch from one grade to another unless the output of said one grade is null when its test signal is thus removed, said sequence switching means being a stepping switch, and means providing a start command to initiate operation of said stepping switch, including relay means having an input from said data elements, said relay means being operative on a null output from said data elements to prepare said sequence switching means for operation, and means for operating said relay in response to both the position and velocity of the movable one of relatively movable machine parts controlled by said servo motor.

10. A test circuit for testing a plurality of grades of data elements controlling a servo motor, each of said data elements having means providing a source of excitation, means for deriving from said providing means a test signal for each grade of data elements, switching means for applying one of said test signals to the input of the corresponding one grade of data elements, sequence switching means operated by the output signal resulting from such applying, said sequence switching means having contacts for removing the test input from said one grade of data element and having other contacts for applying another of said test signals to its corresponding other grade of data element, and means insuring that said sequence switching means will not switch from one grade to another unless the output of said one grade is null when its test signal is thus removed, said sequence switching means being a stepping switch, and mean providing a start command to initiate operation of said stepping switch, including circuits for resetting said stepping switch to start position on completion of a complete cycle of testing said data elements, and switching means for initiating operation of said stepping switch to repeat said cycle of testing.

11. A test circuit for testing a data element controlling a servo motor, said data element having means providing a source of excitation, means for deriving from said providing means a test signal for said data element, switching means for applying a test signal to the input of said data element, sequence switching means operated by the output signal resulting from such applying, said sequence switching means having contacts in one position for supplying said test signal to, and having other contacts in another position for removing said test signal from the input of said data element, and means insuring that said switching means will not switch from one of said positions to the other unless the output of said data element is null when its test signal is thus removed, said sequence switching means being a stepping switch, and means providing a start command to initiate operation of said stepping switch, including relay means having an input from said data elements, said relay means being operative on a null output from said data element to prepare said sequence switching means for operation, and means for operating said relay in response to both the position and velocity of the movable one of relatively movable machine parts controlled by said servo motor.

12. A test circuit for testing a plurality of grades of data elements controlling a servo motor, each of said data elements having means providing a source of excitation, means for deriving from said providing means a test signal for each grade of data elements, switching means for applying one of said test signals to the input of the corresponding one grade of data elements, sequence switching means operated by the output signal resulting from such applying, said sequence switching means having contacts for removing the test input from said one grade of data element and having other contacts for applying another of said test signals to its corresponding other grade of data element, and means insuring that said sequence switching means will not switch from one grade to another unless the output of said one grade is null when its test signal is thus removed, one of said data elements having space quadrature windings, said means providing a source of excitation including means supplying sine and cosine voltages for said quadrature windings, the test signal for said last mentioned data element being a small change in value of said sine and cosine voltages, said grades including fine, medium and coarse grades of data elements, the contacts of said sequence switching means acting to control said data elements in sequence.

References Cited in the file of this patent
UNITED STATES PATENTS
2,792,545    Kamm _____ May 14, 1957